(12) United States Patent
Perego et al.

(10) Patent No.: US 12,519,100 B2
(45) Date of Patent: Jan. 6, 2026

(54) PARTICULATE MATERIAL FOR A COMPOSITE ELECTRODE AND METHOD OF PRODUCING THE PARTICULATE MATERIAL

(71) Applicant: Belenos Clean Power Holding AG, Biel/Bienne (CH)

(72) Inventors: Daniele Perego, Baden (CH); Shiro Tanaka, Basel (CH); Cedric Pitteloud, Delemont (CH); Nana Yamaji, Kyoto (JP); Motoaki Nishijima, Nara (JP)

(73) Assignee: Belenos Clean Power Holding AG, Biel/Bienne (CH)

( * ) Notice: Subject to any disclaimer, the term of this patent is extended or adjusted under 35 U.S.C. 154(b) by 0 days.

(21) Appl. No.: 18/578,090

(22) PCT Filed: Mar. 14, 2022

(86) PCT No.: PCT/EP2022/056517
§ 371 (c)(1),
(2) Date: Jan. 10, 2024

(87) PCT Pub. No.: WO2023/001413
PCT Pub. Date: Jan. 26, 2023

(65) Prior Publication Data
US 2024/0322123 A1    Sep. 26, 2024

(30) Foreign Application Priority Data
Jul. 21, 2021  (EP) .................................... 21187031

(51) Int. Cl.
*H01M 4/36*    (2006.01)
*H01M 4/13*    (2010.01)
(Continued)

(52) U.S. Cl.
CPC ............. *H01M 4/364* (2013.01); *H01M 4/13* (2013.01); *H01M 4/136* (2013.01); *H01M 4/483* (2013.01);
(Continued)

(58) Field of Classification Search
CPC ..... H01M 4/364; H01M 4/136; H01M 4/5815
See application file for complete search history.

(56) References Cited

U.S. PATENT DOCUMENTS

| | | | |
|---|---|---|---|
| 2010/0104948 A1 | 4/2010 | Skotheim et al. | |
| 2016/0164135 A1* | 6/2016 | Fasching | H01M 4/62 429/231.95 |
| 2019/0173082 A1 | 6/2019 | Zhamu et al. | |

FOREIGN PATENT DOCUMENTS

| | | |
|---|---|---|
| CN | 106898750 A | 6/2017 |
| JP | 54-60422 A | 5/1979 |

(Continued)

OTHER PUBLICATIONS

International Search Report issued May 10, 2022 in PCT/EP2022/056517 filed on Mar. 14, 2022, 4 pages.
(Continued)

*Primary Examiner* — Khanh T Nguyen
(74) *Attorney, Agent, or Firm* — Oblon, McClelland, Maier & Neustadt, L.L.P.

(57) ABSTRACT

The present invention discloses a method for producing a particulate material for a composite electrode comprising ball milling of: an electrode active component comprising a transition metal M having a pristine oxidation state of 5+ and optionally 4+ and/or 3+; at least one second additional oxide selected from the group consisting of Li, Al, Cu, Fe, Cr, Mn, Sn, Mo, Ni, Sn, Ag, Ru or Ti and; a first lithium-comprising sulphide compound comprising an element X, X being P, Ge, Si or Sn, wherein an electronically conductive component is added to the electrode active component and the first (Continued)

lithium-comprising sulphide compound, thereby obtaining the particulate material. The present invention further discloses a particulate material obtained by the method, a composite cathode comprising the particulate material and a battery cell comprising the composite cathode.

14 Claims, 2 Drawing Sheets

(51) Int. Cl.
*H01M 4/136* (2010.01)
*H01M 4/48* (2010.01)
*H01M 4/58* (2010.01)
*H01M 4/62* (2006.01)
*H01M 4/02* (2006.01)

(52) U.S. Cl.
CPC ......... *H01M 4/5815* (2013.01); *H01M 4/625* (2013.01); *H01M 2004/028* (2013.01)

(56) References Cited

FOREIGN PATENT DOCUMENTS

| JP | 63-285871 A | 11/1988 |
| JP | 8-162151 A | 6/1996 |
| JP | 11-7981 A | 1/1999 |
| JP | 2017-157473 A | 9/2017 |
| JP | 2020-35607 A | 3/2020 |
| JP | 2020-115425 A | 7/2020 |
| WO | WO 2017/085900 A1 | 5/2017 |

OTHER PUBLICATIONS

Japanese Office Action issued Jan. 7, 2025, in corresponding Japanese Patent Application No. 2023-579713 (with English Translation), 11 pages.

Japanese Office Action issued Jun. 10, 2025, in corresponding Japanese Patent Application No. 2023-579713 (with English Translation), 8 pages.

* cited by examiner

PARTICULATE MATERIAL FOR A COMPOSITE ELECTRODE AND METHOD OF PRODUCING THE PARTICULATE MATERIAL

TECHNICAL FIELD

The present invention relates to a method for producing a particulate material for a composite electrode. The present invention further relates to particulate materials for composite electrodes of a battery or battery cell, in particular to particulate materials obtained by the methods of the invention. The present invention further relates to a composite electrode, in particular a composite cathode, comprising the particulate material, and to a battery cell comprising such a composite electrode, in particular a composite cathode.

BACKGROUND ART

Nowadays, batteries comprising a solid state electrolyte (SSE), so-called solid state batteries (SSB) such as solid state lithium-ion (Li-ion) batteries and solid state lithium-metal batteries, are considered as the next genera-tion battery. Where conventional batteries comprising a liquid electrolyte show limited safety upon use due to the flammability of most liquid electrolytes, solid state batteries are safer in use because the solid electrolyte used in these solid state batteries has a lower flammability.

Further, in terms of performance, commercially available solid electrolytes are close to matching conventionally used liquid electrolytes, especially for lithium sulphide comprising solid electrolytes, such as lithium phosphorus sulphide ($Li_3PS_4$, in short LPS), which has a high ionic conductivity.

One drawback of solid state lithium sulphide electrolytes, such as LPS and LPSBr, is their relatively high density of between 1.5 $g/cm^3$ and 2.0 $g/cm^3$, which is significantly higher than that of conventional liquid electrolytes, typically between 0.9 $g/cm^3$ and 1.1 $g/cm^3$. Consequently, for a same energy density (unit: W*h/l), the solid state battery will be heavier than the conventional battery, when the anode and the cathode, in particular the active materials of the anode and the cathode, are identical for both batteries.

A further drawback of lithium sulphide electrolytes is that they present a thermodynamic narrow electrochemical stability window, between 1.5 V and 2.5 V (vs. Li/Li$^+$). Consequently, these solid state electrolytes are sensitive to degradation when high voltage cathode active materials are used. Examples of high voltage cathode active materials are lithium nickel manganese cobalt oxide (NMC), lithium cobalt oxide (LCO), lithium manganese oxide (LMO) or lithium iron phosphate (LFP).

A known solution to protect lithium sulphide solid state electrolytes from degradation from high voltage cathode active materials includes the use of a protective coating, such as a coating comprising $LiNbO_3$, $LiTiO_3$, and/or $Al_2O_3$, as interface between the cathode active material and the solid state electrolyte. One disadvantage of the use of a coating is an increase in the cost of the battery, and a more complex manufacturing process.

Another solution is an encapsulation of the cathode active material.

WO 97/44840 discloses a composite cathode comprising a sulphur-containing electroactive material, which, when in an oxidized state, comprises a polysulphide moiety —$S_m$—, wherein m is equal to or higher than 3, wherein the sulphur-containing electroactive material is encapsulated in an electroactive transition metal chalcogenide composition, such as vanadium oxide. The electroactive transition metal chalcogenide composition retards the transport of anionic reduction products of the Sulphur-containing electroactive material.

WO 2009/029746 discloses a solid state battery cathode which is a sintered mixture of an cathode active material, such as a lithium intercalation material, for example lithium tin oxide, an electronically conductive material and a solid ionically conductive material, such as a lithium-based solid state electrolyte.

US 2015/0056520 discloses a solid state composite cathode comprising a sintered porous active material, wherein the pores thereof are impregnated with an amorphous inorganic ionically conductive solid electrolyte.

WO 2013/131005 discloses a composite cathode which is an active material dispersed in an amorphous inorganic ionically conductive metal oxide, which acts as a binder. The amorphous inorganic ion conductive metal oxide comprises lithium, lanthanum, zirconium and oxygen, for example lithium lanthanum zirconium oxide (lithium lanthanum zirconate, $Li_7La_3Zr_2O_{12}$, in short LLZO).

Drawbacks/disadvantages of the foregoing methods is that they are often rather complex, and/or may require high temperatures (e.g. for sintering), which may lead to damage of one or more of the components used to make the composite electrode. Further, the use of LLZO as ion conductive material is known to have a lower conductivity, and thus a reduced performance, com-pared to sulphur-based ion conductive materials.

SUMMARY OF THE INVENTION

It is an object of the present invention to overcome one or more of the above drawbacks. It is an aim of the invention to provide a method for producing a particulate material for a composite electrode, wherein the method is less complex.

It is a further aim of the present invention to provide a particulate material for a composite electrode, in particular a composite cathode, wherein the particulate material, when used in an electrode in a battery cell, provides a higher cathode capacity, in particular a cathode capacity higher than the theoretically expected value, in combination with an excellent energy density, and wherein the capacity and energy density are stable over repeated plating/strip-ping of the cathode and charging/discharging of the battery cell.

According to a first aspect of the invention, there is provided a method for producing a particulate material for a composite electrode as disclosed in the appended claims. The method comprises ball milling of an electrode active component and a first lithium-comprising sulphide compound.

The electrode active component comprises at least one transition metal M. The transition metal M has a pristine oxidation state of 5+ and optionally 4+ and/or 3+.

Advantageously, the transition metal M is vanadium (V). When the transition metal M is vanadium, it advantageously has a pristine oxidation state of 5+ and optionally 4+.

Alternatively, the transition metal can be titanium (Ti), chromium (Cr), iron (Fe), manganese (Mn), nickel (Ni), aluminium (Al), ruthenium (Ru), magnesium (Mg), or cobalt (Co). When the transition metal M is iron, it advantageously has a pristine oxidation state of 5+, 4+ and optionally 3+.

Advantageously, when the transition metal M is vanadium, the electrode active component comprises $V_2O_5$, $V_2O_3$, VO, $H_3V_5O_7$, $H_2V_3O_8$, or a mixture of any two or more thereof.

The first lithium-comprising sulphide compound comprises an element X, wherein X is P, Ge, Si or Sn.

An electronically conductive component is added to the electrode active component and the first lithium-comprising sulphide compound, thereby obtaining the particulate material. Preferably, the electronically conductive component comprises a carbon-comprising component.

According to a first embodiment of the first aspect of the invention, the first lithium-comprising sulphide compound advantageously comprises in the pristine state a Li—S—X bond. Advantageously, the first lithium-comprising sulphide compound comprises a LiPS-based component, a LiGePS-based component, a LiSiPS-based component, a LiSnPS-based component, a LiSiSnPS-based component, a LiGeSnPS-based component, or a mixture of any two or more thereof.

Examples of a LiPS-based component are $Li_3PS_4$ (LPS), $Li_6PS_5Y$ (LPSY) wherein Y is Cl, Br or I, $Li_6PS_5Y_{0.5}Z_{0.5}$ wherein Y and Z are different and wherein Y and Z are Cl, Br or I, and $Li_7P_3S_{11}$. An example of $Li_6PS_5Y_{0.5}Z_{0.5}$ is $Li_6PS_5Cl_{0.5}Br_{0.5}$.

According to a second embodiment of the first aspect of the invention, the first lithium-comprising sulphide compound comprises $Li_2S$ and $P_2S_5$. Advantageously, the second embodiment of methods of the invention comprises a first ball milling step of the first lithium-comprising sulphide compound, thereby obtaining a second lithium-comprising sulphide compound. Advantageously, the second lithium-comprising sulphide compound comprises a Li—S—X bond. Advantageously, the second lithium-comprising sulphide compound comprises a LiPS-based component, a LiGePS-based component, a LiSiPS-based component, a LiSnPS-based component, a LiSiSnPS-based component, a LiGeSnPS-based component, or a mixture of any two or more thereof.

Examples of a LiPS-based component are $Li_3PS_4$ (LPS), $Li_6PS_5Y$ (LPSY) wherein Y is Cl, Br or I, $Li_6PS_5Y_{0.5}Z_{0.5}$ wherein Y and Z are different and wherein Y and Z are Cl, Br or I, and $Li_7P_3S_{11}$. An example of $Li_6PS_5Y_{0.5}Z_{0.5}$ is $Li_6PS_5Cl_{0.5}Br_{0.5}$.

The second embodiment advantageously further comprises a second ball milling step of the second lithium-comprising sulphide compound and the electrode active component, thereby obtaining particulate material.

Advantageously, a solvent, preferably an aromatic or an aliphatic solvent or a mixture thereof, is added during the ball milling step. Example of such an aliphatic solvent is heptane and that of an aromatic solvent is xylene, or mesitylene. A mixture of the latter solvents can also be contemplated.

According to a second aspect of the invention, there is provided a particulate material for a composite electrode as disclosed in the appended claims. The particulate material comprises an electrode active component, a lithium-comprising sulphide compound, and an electronically conductive component, wherein the particulate material comprises one or more of the following bonds: $X-S_x-X$, $M_yS_z$, $M_uX_v$, wherein x is between 0 and 2, y is between 0 and 2, z is between 0 and 4 and u is between 0 and 2.

The electrode active component comprises at least one transition metal M. The transition metal M has an oxidation state in the composite of 3+, 4+, 5+, or a mixture of two or more thereof. The lithium-comprising sulphide compound comprises an element X, wherein X is P, Ge, Si or Sn. Preferably, the electronically conductive component comprises a carbon-comprising component.

Advantageously, the transition metal M is vanadium (V).

Advantageously, the electrode active component comprises $V_2O_5$, $V_2O_3$, VO, $H_3V_5O_7$, $H_2V_3O_8$, or a mixture of any two or more thereof.

Advantageously, the lithium-comprising sulphide compound comprises a LiPS-based component, a LiGePS-based component, a LiSiPS-based component, a LiSnPS-based component, a LiSiSnPS-based component, a Li—GeSnPS-based component, or a mixture of any two or more thereof.

Examples of a LiPS-based component are $Li_3PS_4$ (LPS), $Li_6PS_5Y$ (LPSY) wherein Y is Cl, Br or I, $Li_6PS_5Y_{0.5}Z_{0.5}$ wherein Y and Z are different and wherein Y and Z are Cl, Br or I, and $Li_7P_3S_{11}$. An example of $Li_6PS_5Y_{0.5}Z_{0.5}$ is $Li_6PS_5Cl_{0.5}Br_{0.5}$.

Advantageously, the particulate material comprises the electrode active component and the lithium-comprising sulphide compound in a ratio of between 0.1 and 0.9, such as between 0.25 and 0.9, preferably between 0.5 and 0.85, more preferably between 0.6 and 0.75, wherein the ratio is expressed as the weight of the electrode active component divided by the sum of the weight of the electrode active component and the weight of the lithium-comprising sulphide compound.

The particulate material is advantageously obtained by methods of the invention.

The present invention further provides a composite electrode comprising the particulate material of the invention. Preferably, the composite electrode is a composite cathode.

The present invention further provides a battery cell comprising a composite electrode of the invention, preferably a composite cathode.

Advantages of the methods of the present invention are, without being limited thereto, that a particulate material is obtained which, when used in a cathode in a battery cell, comprises a surprisingly high cathode capacity and an excellent energy density. Further, this high capacity and energy density values remain stable over repeated charging/discharging, and can thus contribute to a prolonged lifetime of the battery cell. Methods of the invention are further less complex than state-of-the-art methods, and exclude the need for any binder materials to be used.

BRIEF DESCRIPTION OF DRAWINGS

Aspects of the invention will now be described in more detail with reference to the appended drawings, wherein same reference numerals illus-trate same features.

DETAILED DESCRIPTION

Figure 1:
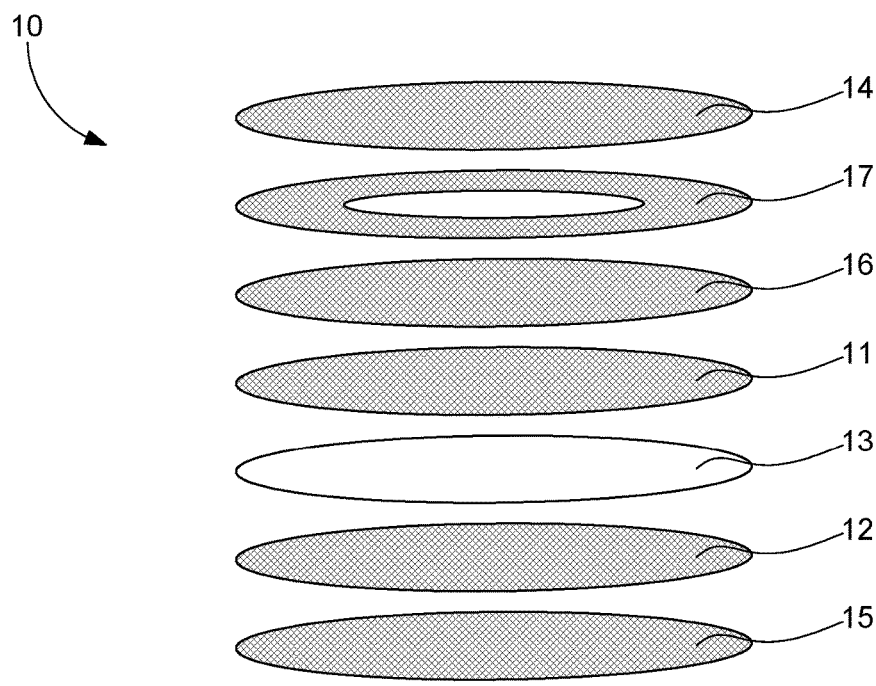
FIG. 1 represents schematically the configuration of a typical coin cell.

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided for thoroughness and completeness.

Methods for producing a particulate material for a composite electrode according to the first aspect of the invention comprise ball milling of an electrode active component and a first lithium-comprising sulphide compound.

Advantageously, the electrode active component comprises at least one transition metal M. The transition metal M advantageously has a pristine oxidation state of 5+ and optionally 4+ and/or 3+. The transition metal can be vanadium (V) titanium (Ti), chromium (Cr), iron (Fe), manganese (Mn), nickel (Ni), aluminium (Al), magnesium (Mg), silver (Ag), gold (Au), cobalt (Co), cop-per (Cu), zinc (Zn), ruthenium (Ru), palladium (Pd), cadmium (Cd) or platinum (Pt). Preferably, the transition metal is vanadium (V). When the transition metal M is vanadium, it advantageously has a pristine oxidation state of 5+ and optionally 4+. When the transition metal M is iron, it advantageously has a pristine oxidation state of 5+, 4+ and optionally 3+.

Advantageously, when the transition metal M is vanadium, the electrode active component comprises $V_2O_5$ (pristine oxidation state of 5+), $V_2O_3$, VO, $H_3V_5O_7$, $H_2V_3O_8$ (pristine oxidation state of 4+ and 5+), or a mixture of any two or more thereof.

Advantageously, the first lithium-comprising sulphide compound comprises an element X. Advantageously, X is P, Ge, Si or Sn.

Advantageously, an electronically conductive component is added to the electrode active component and the first lithium-comprising sulphide compound. The electronically conductive component can be added prior, during and/or after the ball milling is carried out. For example, a first portion of the electronically conductive component, or a first electronically conductive component is added prior to performing the ball milling, and a second portion of the electronically conductive component or a second electronically conductive component is added during the ball milling.

Preferably, the electronically conductive component comprises a carbon-comprising component, such as carbon fibres, carbon nanotubes, particulate carbon (e.g. a powder), or a combination of two or more thereof.

Optionally, an additional component can be added prior to and/or during ball milling. Preferred examples of such an additional component are dopant elements, such as Li, Al, Cu, Fe, Cr, Mn, Sn, Mo, Ni, Sn, Ag, Ru, for example oxides comprising one or more dopant elements.

Examples of such oxides comprising one or more dopant elements are $Li_2O$, $LiO_2$, $MnO_2$, $MnO_3$, $Mn_2O_7$, $TiO_2$, TiO, $Ti_2O_3$, $RuO_2$, NiO, $Ni_2O_3$, $Cr_2O_3$, or $CrO_5$.

Optionally, a solvent is added to the electrode active component and the first lithium-comprising sulphide compound. Preferred examples of solvents are heptane, xylene, acetonitrile, mesitylene and mixtures of two or more thereof. When a solvent is added, the ball milling is considered a wet ball milling. Advantageously, the solvent is added prior to and/or during the ball milling.

Advantageously, the ball milling is carried out at a speed between 100 rpm and 1000 rpm, such as between 150 rpm and 750 rpm, preferably between 200 rpm and 600 rpm. The optimal speed for the ball milling depends on, without being limited thereto, the composition and the relative quantities of the components, whether a solvent and/or the electronically conductive component are added, the type of solvent, and the equipment used.

Advantageously, the ball milling is carried out for a duration between 1 minute and 240 minutes, such as between 5 minutes and 180 minutes, between 10 minutes and 150 minutes, preferably between 15 minutes and 120 minutes, for example between 30 minutes and 90 minutes, more preferably between 45 minutes and 75 minutes. The optimal duration for the ball milling depends on, without being limited thereto, the composition and the relative quantities of the components, whether a solvent and/or the electronically conductive component are added, the type of solvent, the ball milling speed, and the equipment used.

The inventors have surprisingly discovered that by using an optimal combination of parameters, such as speed and duration, for the mixture of components that undergoes ball milling, a particulate material is obtained which has a surprisingly high energy capacity, in particular an energy capacity significantly higher than the theoretically expected value calculated from the mixture of individual components. The inventors have further noticed that the particulate material, when used in a cathode for a battery cell, can be charged and discharged repeatedly.

The inventors have further noticed that the individual components, in particular the electrode active component and the lithium-comprising sulphide compound, i.e. the first lithium-comprising sulphide compound for the first embodiment and the second lithium-comprising sulphide compound for the second embodiment, are no longer distinguishable in the particulate material. In other words, and without wishing to be bound by any theory, the components react with each other during the ball milling according to the invention.

According to a first embodiment of the first aspect of the invention, the first lithium-comprising sulphide compound advantageously comprises in the pristine state a Li—S—X bond. Advantageously, the first lithium-comprising sulphide compound comprises a LiPS-based component, a LiGePS-based component, a LiSiPS-based component, a LiSnPS-based component, a LiSiSnPS-based component, a LiGeSnPS-based component, or a mixture of any two or more thereof.

Examples of a LiPS-based component are $Li_3PS_4$ (LPS), $Li_6PS_5Y$ (LPSY) wherein Y is Cl, Br or I, $Li_6PS_5Y_{0.5}Z_{0.5}$ wherein Y and Z are different and wherein Y and Z are Cl, Br or I, and $Li_7P_3S_{11}$. An example of $Li_6PS_5Y_{0.5}Z_{0.5}$ is $Li_6PS_5Cl_{0.5}Br_{0.5}$. Examples of a LiPS-based component are $Li_3PS_4$ (LPS), $Li_6PS_5Y$ (LPSY) wherein Y is Cl, Br or I, $Li_6PS_5Y_{0.5}Z_{0.5}$ wherein Y and Z are different and wherein Y and Z are Cl, Br or I, and $Li_7P_3S_{11}$. An example of $Li_6PS_5Y_{0.5}Z_{0.5}$ is $Li_6PS_5Cl_{0.5}Br_{0.5}$.

Examples of a LiGePS-based component are $Li_{4-a}Ge_{1-a}P_aS_4$ wherein x is between 0 and 1, and $Li_{10}GeP_2S_{12}$. Examples of a LiSnPS-based component are $Li_{4-a}Sn_{1-a}P_aS_4$ wherein x is between 0 and 1. Examples of a LiSiPS-based component are $Li_{4-a}Si_{1-a}P_aS_4$ wherein x is between 0 and 1. Examples of a LiSiSnPS-based component are $Li_{4-a}(Si_{1-b}Sn_b)_{1-a}P_aS_4$ wherein x is between 0 and 1 and b is between 0 and 1. Examples of a LiGeSnPS-based component are $Li_{4-a}(Ge_{1-b}Sn_b)_{1-a}P_aS_4$ wherein x is between 0 and 1 and b is between 0 and 1.

The electrode active component is advantageously as described above.

The electronically conductive component is advantageously as described above, and is advantageously added to the electrode active component and the first lithium-comprising sulphide compound as described above.

Optionally, a solvent as described above is added to the electrode active component and the first lithium-comprising sulphide compound as described above.

Advantageously, the ratio of the electrode active component and the first lithium-comprising sulphide compound is between 0.1 and 0.9, preferably between 0.5 and 0.85, more preferably between 0.6 and 0.75, wherein the ratio is expressed as the weight of the electrode active component divided by the sum of the weight of the electrode active component and the weight of the lithium-comprising sulphide compound.

Advantageously, the weight of the electronically conductive component is between 0.5% by weight and 20% by weight based on the sum of the weight of the electrode active component, the first lithium-comprising sulphide compound and the electronically conductive component, such as between 1% by weight and 15% by weight, preferably between 2% by weight and 10% by weight, more preferably between 2.5% by weight and 7.5% by weight, for example between 4% by weight and 6% by weight.

When a solvent is used, the ratio of the solvent and the electrode active component, the first lithium-comprising sulphide compound and the electronically conductive component is advantageously between 0.5 and 4, preferably between 0.75 and 3, more preferably between 1 and 2, wherein the ratio is expressed as the weight of the solvent divided by the sum of the weight of the electrode active component, the first lithium-comprising sulphide compound and the electronically conductive component when added prior to or during ball milling.

A second embodiment of the first aspect of the invention differs from the first embodiment in that the first lithium-comprising sulphide compound comprises $Li_2S$ and $P_2S_5$ and in that a first ball milling step of the first lithium-comprising sulphide compound comprising $Li_2S$ and $P_2S_5$ is performed, thereby obtaining a second lithium-comprising sulphide compound. The first ball milling can be performed at a speed and for a duration as described in European patent EP 2 988 360.

The second lithium-comprising sulphide compound advantageously has the same composition of the first lithium-comprising sulphide compound of the first embodiment. Advantageously, the second lithium-comprising sulphide compound comprises a Li—S—X bond. Advantageously, the second lithium-comprising sulphide compound comprises a LiPS-based component, a LiGePS-based component, a LiSiPS-based component, a LiSnPS-based component, a LiSiSnPS-based component, a LiGeSnPS-based component, or a mixture of any two or more thereof.

Examples of a LiPS-based component are $Li_3PS_4$ (LPS), $Li_6PS_5Y$ (LPSY) wherein Y is Cl, Br or I, $Li_6PS_5Y_{0.5}Z_{0.5}$ wherein Y and Z are different and wherein Y and Z are Cl, Br or I, and $Li_7P_3S_{11}$. An example of $Li_6PS_5Y_{0.5}Z_{0.5}$ is $Li_6PS_5Cl_{0.5}Br_{0.5}$. Examples of a LiPS-based component are $Li_3PS_4$ (LPS), $Li_6PS_5Y$ (LPSY) wherein Y is Cl, Br or I, $Li_6PS_5Y_{0.5}Z_{0.5}$ wherein Y and Z are different and wherein Y and Z are Cl, Br or I, and $Li_7P_3S_{11}$. An example of $Li_6PS_5Y_{0.5}Z_{0.5}$ is $Li_6PS_5Cl_{0.5}Br_{0.5}$.

Examples of a LiGePS-based component are $Li_{4-a}Ge_{1-a}P_aS_4$ wherein x is between 0 and 1, and $Li_{10}GeP_2S_{12}$. Examples of a LiSnPS-based component are $Li_{4-a}Sn_{1-a}P_aS_4$ wherein x is between 0 and 1. Examples of a LiSiPS-based component are $Li_{4-a}Si_{1-a}P_aS_4$ wherein x is between 0 and 1. Examples of a LiSiSnPS-based component are $Li_{4-a}(Si_{1-b}Sn_b)_{1-a}P_aS_4$ wherein x is between 0 and 1 and b is between 0 and 1. Examples of a LiGeSnPS-based component are $Li_{4-a}(Ge_{1-b}Sn_b)_{1-a}P_aS_4$ wherein x is between 0 and 1 and b is between 0 and 1.

The second embodiment further comprises a second ball milling step of the electrode active component and the second lithium-comprising sulphide compound. Advantageously, the second ball milling step is performed according to the ball milling of the first embodiment in terms of duration and speed.

The electrode active material is advantageously as described above.

Advantageously, the electrode active component and the second lithium-comprising sulphide compound are present in the second ball milling step in a ratio of between 0.1 and 0.9, preferably between 0.5 and 0.85, more preferably between 0.6 and 0.75, wherein the ratio is expressed as the weight of the electrode active component divided by the sum of the weight of the electrode active component and the weight of the lithium-comprising sulphide compound.

The electronically conductive component is advantageously as described above. The electronically conductive component can be added to the first lithium-comprising sulphide compound prior to and/or during the first ball milling step, and/or to the second lithium-comprising sulphide compound prior to, during and/or after the second ball milling step.

When the electronically conductive component is added to the first lithium-comprising sulphide compound, the weight of the electronically conductive component is between 0.5% by weight and 20% by weight based on the sum of the weight of the first lithium-comprising sulphide compound and the electronically conductive component, such as between 1% by weight and 15% by weight, preferably between 2% by weight and 10% by weight, more preferably between 2.5% by weight and 7.5% by weight, for example between 4% by weight and 6% by weight.

When the electronically conductive component is added to the second lithium-comprising sulphide compound and thus also to the electrode active compound, the weight of the electronically conductive component is between 0.5% by weight and 20% by weight based on the sum of the weight of the electrode active material, the second lithium-comprising sulphide compound and the electronically conductive component, such as between 1% by weight and 15% by weight, preferably between 2% by weight and 10% by weight, more preferably between 2.5% by weight and 7.5% by weight, for example between 4% by weight and 6% by weight.

Optionally, a solvent as described above is added prior to and/or during the first ball milling. Optionally, a solvent as described above is added prior to and/or during the second ball milling.

When a solvent is added to the first lithium-comprising sulphide compound and to the second lithium-comprising sulphide compound, the solvents are advantageously the same. Alternatively, a first solvent can be added to the first lithium-comprising sulphide compound and a second solvent can be added to the second lithium-comprising sulphide compound.

When a solvent is added to the first lithium-comprising sulphide compound, the ratio of the solvent and the first lithium-comprising sulphide compound and the electronically conductive component when added to the first lithium-comprising sulphide compound is advantageously between 0.5 and 1.5, preferably between 0.75 and 1.25, more preferably between 0.9 and 1.1, wherein the ratio is expressed as the weight of the solvent divided by the sum of the weight of the the first lithium-comprising sulphide compound and, when added to the first lithium-comprising sulphide compound, the electronically conductive component.

When a solvent is added to the second lithium-comprising sulphide compound, the ratio of the solvent and the electrode active component, the second lithium-comprising sulphide compound and the electronically conductive component when added to the electrode active component and the second lithium-comprising sulphide compound is advantageously between 0.5 and 4, preferably between 0.75 and 3, more preferably between 1 and 2, wherein the ratio is expressed as the weight of the solvent divided by the sum of the weight of the electrode active material, the second lithium-comprising sulphide compound and, when added, the electronically conductive component.

A third embodiment of the first aspect of the invention differs from the second embodiment in that the first ball milling step and the second ball milling step are combined in one ball milling step. In other words, the method comprises ball milling of an electrode active component as described above and a first lithium-comprising sulphide compound comprising $Li_2S$ and $P_2S_5$.

The ball milling is advantageously performed at a speed and/or for a duration as described above.

An electronically conductive component as described above is advantageously added as described in the first embodiment.

A solvent as described above can be added as described in the first embodiment.

A second aspect of the present invention discloses a particulate ma-terial for a composite electrode. The particulate material comprises an electrode active component, a lithium-comprising sulphide compound, and an electronically conductive component, wherein the particulate material comprises one or more of the following bonds: $X-S_x-X$, $M_yS_z$, $M_uX_v$, wherein x is between 0 and 2, y is between 0 and 2, z is between 0 and 4 and u is between 0 and 2.

The electrode active component comprises at least one transition metal M having an oxidation state in the particulate material of 3+, 4+, 5+, or a mixture of two or more thereof. Advantageously, the transition metal is as described above, and is preferably vanadium (V). Advantageously, the electrode active component comprises $V_2O_5$, $V_2O_3$, VO, $H_3V_5O_7$, $H_2V_3O_8$, or a mixture of any two or more thereof.

The lithium-comprising sulphide compound comprises an element X, wherein X is P, Ge, Si or Sn. Advantageously, the lithium-comprising sulphide compound comprises a LiPS-based component, a LiGePS-based component, a LiSiPS-based component, a LiSnPS-based component, a LiSiSnPS-based component, a LiGeSnPS-based component, or a mixture of any two or more thereof.

Examples of a LiPS-based component are $Li_3PS_4$ (LPS), $Li_6PS_5Y$ (LPSY) wherein Y is Cl, Br or I, $Li_6PS_5Y_{0.5}Z_{0.5}$ wherein Y and Z are different and wherein Y and Z are Cl, Br or I, and $Li_7P_3S_{11}$. An example of $Li_6PS_5Y_{0.5}Z_{0.5}$ is $Li_6PS_5Cl_{0.5}Br_{0.5}$. Examples of a LiPS-based component are $Li_3PS_4$ (LPS), $Li_6PS_5Y$ (LPSY) wherein Y is Cl, Br or I, $Li_6PS_5Y_{0.5}Z_{0.5}$ wherein Y and Z are different and wherein Y and Z are Cl, Br or I, and $Li_7P_3S_{11}$. An example of $Li_6PS_5Y_{0.5}Z_{0.5}$ is $Li_6PS_5Cl_{0.5}Br_{0.5}$.

Examples of a LiGePS-based component are $Li_{4-a}Ge_{1-a}P_aS_4$ wherein x is between 0 and 1, and $Li_{10}GeP_2S_{12}$. Examples of a LiSnPS-based component are $Li_{4-a}Sn_{1-a}P_aS_4$ wherein x is between 0 and 1. Examples of a LiSiPS-based component are $Li_{4-a}Si_{1-a}P_aS_4$ wherein x is between 0 and 1. Examples of a LiSiSnPS-based component are $Li_{4-a}(Si_{1-b}Sn_b)_{1-a}P_aS_4$ wherein x is between 0 and 1 and b is between 0 and 1. Examples of a LiGeSnPS-based component are $Li_{4-a}(Ge_{1-b}Sn_b)_{1-a}P_aS_4$ wherein x is between 0 and 1 and b is between 0 and 1.

Advantageously, the electronically conductive component is as described above. Preferably, the electronically conductive component comprises a carbon-comprising component, such as carbon fibres or carbon nanotubes.

Advantageously, the particulate material comprises the electrode active component and the lithium-comprising sulphide compound in a ratio of between 0.1 and 0.9, preferably between 0.5 and 0.85, more preferably between 0.6 and 0.75, wherein the ratio is expressed as the weight of the electrode active component divided by the sum of the weight of the electrode active component and the weight of the lithium-comprising sulphide compound.

Preferably, the particulate material is obtained by methods of the present invention.

The inventors have noticed that in particulate materials of the invention, in particular particulate materials obtained by methods of the invention, two or more components of the particulate material are no longer individually distinguishable. In particular, the electrode active component and the lithium-comprising sulphide compound are not distinguishable in the particulate mate-rial, which indicates that reaction between these components takes place during production of the particulate material, thereby forming bonds between the components.

In particular, when the transition metal is vanadium, the presence of oxidation states in the particulate material of 3+, 4+, 5+ indicates that a chem-ical reaction took place between the electrode active component and another component.

The inventors have surprisingly discovered that particulate materials obtained by methods of the present invention have a surprisingly high energy capacity, in particular an energy capacity significantly higher than the theoreti-cally expected value calculated from the mixture of individual components. The inventors have further noticed that the particulate material, when used in a cath-ode for a battery cell, can be charged and discharged repeatedly.

The present invention further discloses a composite electrode comprising the particulate material. Preferably, the electrode is a cathode, i.e. a composite cathode comprising the particulate material. Advantageously, the cathode consists of the particulate material.

The present invention further discloses a battery or battery cell comprising such a composite electrode, preferably such a composite cathode.

FIG. 1 represents an exemplary embodiment of a battery cell 10. The battery cell 10 has a coin-cell configuration known in the art as a CR2032 type configuration. The battery cell 10 comprises an anode 11 and a cathode 12. The cathode 12 is an electrode according to the present invention. The battery cell 10 further comprises a solid state electrolyte 13 between the anode 11 and the cathode 12. The anode can for example be a graphite-based anode. Advantageously, the battery cell 10 further comprises a coin cell lid 14, a coin cell base 15, a spacer 16 and a spring 17. The spacer 16 and the spring 17 provide good contact between the other components 11, 12, 13, 14, 15 of the battery cell 10.

The solid state electrolyte may be a solid polymer or a solid inorganic material, such as a solid inorganic glass or a ceramic material, for example a garnet material. For example, the solid state electrolyte may be a lithium sulphide solid state electrolyte, preferably $Li_3PS_4$ or $Li_6PS_5Br$, or may be poly(eth-ylene oxide) (PEO) with lithium salts dispersed in the polymer matrix of the PEO. Alternatively, the solid state electrolyte may be a garnet ceramic, such as a lithium-stuffed garnet material, for example lithium lanthanum zirconium oxide ($Li_7La_3Zr_2O_{12}$, abbreviated as LLZO).

The solid state electrolyte can be the same as the lithium-comprising sulphide compound of the particulate material comprised in the cathode.

EXAMPLES

Comparative Example 1

A first reference cathode was made by ball milling of 6.9 g of lithium nickel manganese cobalt oxide (LiNiMnCoO2), abbreviated as NMC, as the electrode active component, 2.6 g of lithium phosphorus sulphide ($Li_3PS_4$), abbreviated as LPS, as the first lithium-comprising sulphide compound and 0.5 g of VGCF (vapour grown carbon fibres, manufactured by Showa Denko) as electronically conductive component in 20 g of heptane as solvent. The ball milling was performed using a ball mill equipment (Fritsch, P6) at 500 rpm for 1 hour, using 1058 g of 4 mm diameter zirconia balls. The obtained mixture was then pressed into a pellet at a pressure of 100 MPa to make a ϕ10 mm×90 µm cathode. A battery cell according to FIG. 1 was made with the first reference cathode, LPS as solid state electrolyte and InLi (Indium-Lithium alloy) as anode. The battery cells were sealed with a pneumatic press using a pressure of 80 MPa.

Comparative Example 2

A second reference cathode was made by mixing 6.9 g of $V_2O_5$ as the electrode active component, 2.6 g of lithium phosphorus sulphide ($Li_3PS_4$), abbreviated as LPS, as the first lithium-comprising sulphide compound and 0.5 g of VGCF (Showa Denko) as electronically conductive component in 20 g of heptane as solvent. The mixing was performed by hand in a mortar for 15 minutes. The obtained mixture was then pressed into a pellet at a pressure of 500 MPa to make a ϕ10 mm×90 µm cathode. A battery cell was made as described in comparative example 1 using the second reference cathode.

Example 1

Four cathodes according to the invention were made using varying amounts of $V_2O_5$ as the electrode active component and LPS as the first lithium-comprising sulphide compound. Table 1 shows the composition of the cathodes, wherein example 1-1 to example 1-4 refer to the four cathodes of this example. The total amount of $V_2O_5$ and LPS was kept constant at 9.5 g, as well as the amount and type of the electronically conductive component (0.5 g of VGCF (Showa Denko)) and the solvent (20 g heptane). Examples 1-5 and 1-6 are the cathodes as obtained in example 1-1 wherein 20 g of heptane as solvent is replaced with 20 g of xylene and 20 g of mesitylene respectively. The ball milling was performed as described in comparative example 1. Four battery cells were made as described in comparative example 1 using the inventive cathodes.

Example 1'

Four cathodes according to the invention were made using varying amounts of $V_2O_5$ and NiO as the electrode active component and LPS as the first lithium-comprising sulphide compound. Table 1 shows the composition of the cathodes, wherein example 1'-1 to example 1'-4 refer to the four cathodes of this example. The total amount of $V_2O_5$, NiO and LPS was kept constant at 9.5 g, as well as the amount and type of the electronically conductive component (0.5 g of VGCF (Showa Denko)) and the solvent (20 g heptane). Example 1'-5 is the cathode as obtained in example 1'-1 wherein 20 g of heptane as solvent is replaced with 20 g of mesitylene or xylene. The ball milling was performed as described in comparative example 1'. Four battery cells were made as described in comparative example 1 using the inventive cathodes.

Example 1''

Four cathodes according to the invention were made using varying amounts of $V_2O_5$ and $MnO_2$ as the electrode active component and LPS as the first lithium-comprising sulphide compound. Table 1 shows the composition of the cathodes, wherein example 1''-1 to example 1''-4 refer to the four cathodes of this example. The total amount of $V_2O_5$, $MnO_2$ and LPS was kept constant at 9.5 g, as well as the amount and type of the electronically conductive component (0.5 g of VGCF (Showa Denko)) and the solvent (20 g heptane). Example 1''-5 is the cathode as obtained in example 1''-1 wherein 20 g of heptane as solvent is replaced with 20 g of mesitylene or xylene. The ball milling was performed as described in comparative example 1. Four battery cells were made as described in comparative example 1 using the inventive cathodes.

Example 1'''

Four cathodes according to the invention were made using varying amounts of $V_2O_5$ and $Mn_2O_3$ as the electrode active component and LPS as the first lithium-comprising sulphide compound. Table 1 shows the composition of the cathodes, wherein example 1'''-1 to example 1'''-4 refer to the four cathodes of this example. The total amount of $V_2O_5$, $Mn_2O_3$ and LPS was kept constant at 9.5 g, as well as the amount and type of the electronically conductive component (0.5 g of VGCF (Showa Denko)) and the solvent (20 g heptane). Example 1'''-5 is the cathode as obtained in example 1'''-1 wherein 20 g of heptane as solvent is replaced with 20 g of mesitylene or xylene. The ball milling was performed as described in comparative example 1. Four battery cells were made as described in comparative example 1 using the inventive cathodes.

Example 2

Four cathodes according to the invention were made using varying amounts of $V_2O_5$ as the electrode active component and $Li_6PS_5Br$ as the first lithium-comprising sulphide compound. Table 1 shows the composition of the cathodes, wherein example 2-1 to example 2-4 refer to the four cathodes of this example. The total amount of $V_2O_5$ and $Li_6PS_5Br$ was kept constant at 9.5 g, as well as the amount and type of the electronically conductive component (0.5 g of VGCF (Showa Denko)) and the solvent (20 g heptane). The ball milling was performed as described in comparative example 1. Four battery cells were made as described in comparative example 1 using the inventive cathodes and using $Li_6PS_5Br$ as solid state electrolyte.

TABLE 1

| Example | Cathode active component (AM) | Lithium-comprising sulphide compound (LSC) | Electronically conductive component | Method | Ratio AM/(AM + LSC) |
| --- | --- | --- | --- | --- | --- |
| Comparative 1 | 7.5 g | 2.0 g | 0.5 g | Ball milling | 0.79 |
| Comparative 2 | 6.9 g | 2.6 g | 0.5 g | Ball milling | 0.73 |
| Example 1-1 | 1.5 g | 8.0 g | 0.5 g | Ball milling | 0.16 |
| Example 1-2 | 3.0 g | 6.5 g | 0.5 g | Ball milling | 0.32 |

TABLE 1-continued

| Example | Cathode active component (AM) | Lithium-comprising sulphide compound (LSC) | Electronically conductive component | Method | Ratio AM/(AM + LSC) |
|---|---|---|---|---|---|
| Example 1-3 | 4.75 g | 4.75 g | 0.5 g | Ball milling | 0.50 |
| Example 1-4 | 6.9 g | 2.6 g | 0.5 g | Ball milling | 0.73 |
| Example 1-5 | 1.5 g | 8.0 g | 0.5 g | Ball milling | 0.16 |
| Example 1-6 | 1.5 g | 8.0 g | 0.5 g | Ball milling | 0.16 |
| Example 1'-1 | 1.0 g $V_2O_5$; 0.5 g NiO | 8.0 g | 0.5 g | Ball milling | 0.16 |
| Example 1'-2 | 2.0 g $V_2O_5$; 1.0 g NiO | 6.5 g | 0.5 g | Ball milling | 0.32 |
| Example 1'-3 | 3.17 g $V_2O_5$; 1.58 g NiO | 4.75 g | 0.5 g | Ball milling | 0.5 |
| Example 1'-4 | 4.6 g $V_2O_5$; 2.3 g NiO | 2.6 g | 0.5 g | Ball milling | 0.73 |
| Example 1'-5 | 1.0 g $V_2O_5$; 0.5 g NiO | 8.0 g | 0.5 g | Ball milling | 0.16 |
| Example 1''-1 | 1.0 g $V_2O_5$; 0.5 g $MnO_2$ | 8.0 g | 0.5 g | Ball milling | 0.16 |
| Example 1''-2 | 2.0 g $V_2O_5$; 1.0 g $MnO_2$ | 6.5 g | 0.5 g | Ball milling | 0.32 |
| Example 1''-3 | 3.17 g $V_2O_5$; 1.58 g $MnO_2$ | 4.75 g | 0.5 g | Ball milling | 0.5 |
| Example 1''-4 | 4.6 g $V_2O_5$; 2.3 g $MnO_2$ | 2.6 g | 0.5 g | Ball milling | 0.73 |
| Example 1''-5 | 1.0 g $V_2O_5$; 0.5 g NiO | 8.0 g | 0.5 g | Ball milling | 0.16 |
| Example 1'''-1 | 1.0 g $V_2O_5$; 0.5 g $Mn_2O_3$ | 8.0 g | 0.5 g | Ball milling | 0.16 |
| Example 1'''-2 | 2.0 g $V_2O_5$; 1.0 g $Mn_2O_3$ | 6.5 g | 0.5 g | Ball milling | 0.32 |
| Example 1'''-3 | 3.17 g $V_2O_5$; 1.58 g $Mn_2O_3$ | 4.75 g | 0.5 g | Ball milling | 0.5 |
| Example 1'''-4 | 4.6 g $V_2O_5$; 2.3 g $Mn_2O_3$ | 2.6 g | 0.5 g | Ball milling | 0.73 |
| Example 1'''-5 | 1.0 g $V_2O_5$; 0.5 g NiO | 8.0 g | 0.5 g | Ball milling | 0.16 |
| Example 2-1 | 1.5 g | 8.0 g | 0.5 g | Ball milling | 0.16 |
| Example 2-2 | 3.0 g | 6.5 g | 0.5 g | Ball milling | 0.32 |
| Example 2-3 | 4.75 g | 4.75 g | 0.5 g | Ball milling | 0.50 |
| Example 2-4 | 6.9 g | 2.6 g | 0.5 g | Ball milling | 0.73 |

Example 3

The performance of the battery cells was measured by measuring the cathode capacity, the average voltage and the energy density by means of a biologic VMP-300 potentiostat, and by comparing the measured cathode capacity with the theoretical cathode capacity.

Table 2 shows the values of the theoretical capacity, the cathode capacity, the average voltage and the energy density for each of the two reference battery cells ("Comparative 1" and "Comparative 2") and for each of the battery cells according to the invention.

The theoretical capacity, expressed in mAh per gram of electrode active component, is the cathode capacity value calculated based on the components used to make the cathode, assuming a mixture of these components without any interaction or reacting taking place between two or more components.

The measured capacity is the cathode capacity as measured.

TABLE 2

| Example | Theoretical capacity (mAh/$g_{AM}$) | Measured capacity (mAh/$g_{AM}$) | Measured capacity (mAh/$g_{electrode}$) | Measured average voltage (V) vs Li/Li$^+$ | Energy density (Wh/kg) |
|---|---|---|---|---|---|
| Comparative 1 | 160 | 160 | 120 | 3.65 | 125 |
| Comparative 2 | 230 | 230 | 160 | 3 | 116 |
| Example 1-1 | 230 | 764 | 115 | 2.6 | 57 |
| Example 1-2 | 230 | 459 | 138 | 2.6 | 73 |
| Example 1-3 | 230 | 345 | 164 | 2.6 | 93 |
| Example 1-4 | 230 | 270 | 187 | 2.6 | 118 |
| Example 1-5 | 230 | 1667 | 250 | 2.6 | 123 |
| Example 1-6 | 230 | 1667 | 250 | 2.6 | 123 |
| Example 1'-1 | 230 | 1400 | 140 | 2.6 | 68 |
| Example 1'-2 | 230 | 840 | 168 | 2.6 | 85 |
| Example 1'-3 | 230 | 628 | 199 | 2.6 | 105 |
| Example 1'-4 | 230 | 496 | 228 | 2.6 | 128 |

TABLE 2-continued

| Example | Theoretical capacity (mAh/g$_{AM}$) | Measured capacity (mAh/g$_{AM}$) | Measured capacity (mAh/g$_{electrode}$) | Measured average voltage (V) vs Li/Li$^+$ | Energy density (Wh/kg) |
|---|---|---|---|---|---|
| Example 1'-5$^a$ | 230 | 2700 | 270 | 2.6 | 130 |
| Example 1"-1 | 230 | 830 | 83 | 2.6 | 41 |
| Example 1"-2 | 230 | 490 | 98 | 2.6 | 50 |
| Example 1"-3 | 230 | 382 | 121 | 2.6 | 64 |
| Example 1"-4 | 230 | 339 | 156 | 2.6 | 88 |
| Example 1"-5$^a$ | 230 | 2000 | 200 | 2.6 | 97 |
| Example 1'''-1 | 230 | 220 | 22 | 2.6 | 11 |
| Example 1'''-2 | 230 | 125 | 25 | 2.6 | 13 |
| Example 1'''-3 | 230 | 120 | 38 | 2.6 | 20 |
| Example 1'''-4 | 230 | 89 | 41 | 2.6 | 23 |
| Example 1'''-5$^a$ | 230 | 500 | 50 | 2.6 | 25 |
| Example 2-1 | 230 | 826 | 124 | 2.6 | 62 |
| Example 2-2 | 230 | 610 | 183 | 2.6 | 96 |
| Example 2-3 | 230 | 412 | 196 | 2.6 | 111 |
| Example 2-4 | 230 | 345 | 239 | 2.6 | 149 |

$^a$Capacity and energy density measurements yielded nearly identical values for cathodes prepared using mesitylene and xylene.

From Table 1 it is clear that for the reference battery cell comprising NMC as electrode active component in the cathode ("Comparative 1"), the measured cathode capacity is the same as the theoretical cathode capacity. Also the reference battery cell comprising $V_2O_5$ as electrode active component in the cathode, the cathode being made form a particulate material obtained by hand mixing ("Comparative 2") has a measured cathode capacity that equals the theoretical cathode capacity.

However, all battery cells comprising a cathode comprising a particulate material obtained by ball milling according to the invention have a measured cathode capacity that is higher than the theoretical capacity. When comparing the second reference battery cell ("Comparative 2") with the battery cell having a cathode obtained from the same starting composition (type and mass of each component) ("Example 1-4") it is clear that the measured cathode capacity is significantly higher when the particulate material used to make the cathode is obtained by means of ball milling.

Figure 2:
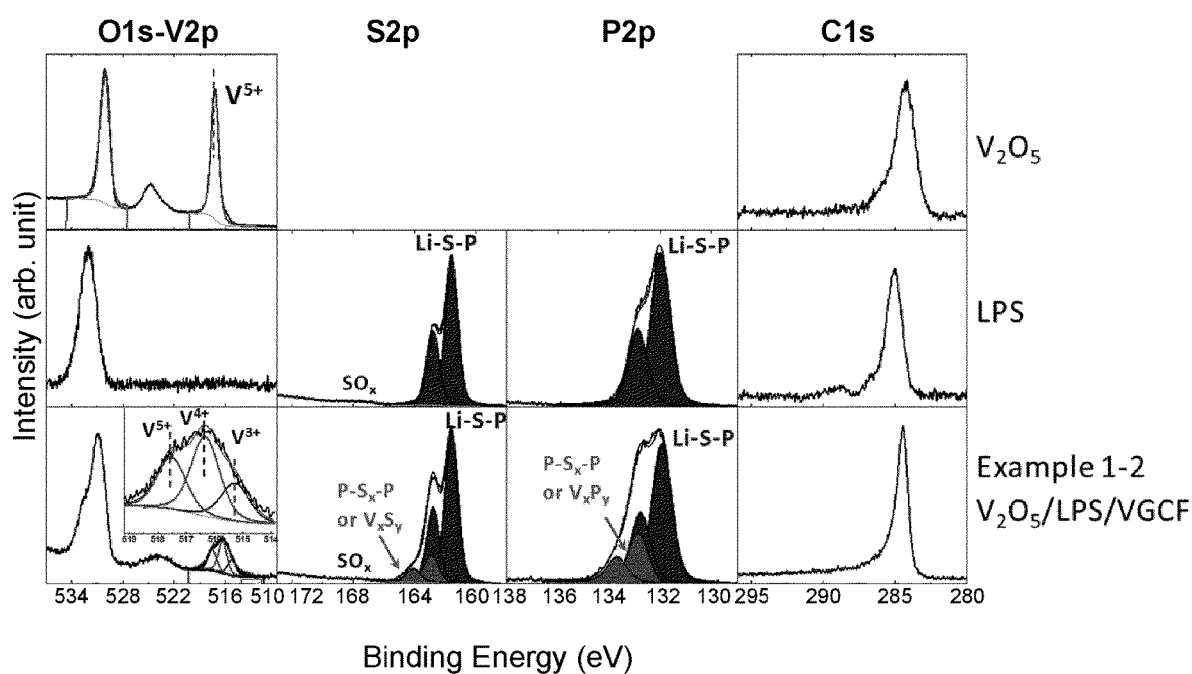
FIG. 2 represents XPS results for an inventive particulate material.

These higher values are obtained because during ball milling new bonds are formed between the electrode active component and the lithium-comprising sulphide compound, leading to a particulate material having improved properties FIG. 2 shows the X-ray Photoelectron Spectroscopy (XPS) results for $V_2O_5$, LPS and the particulate material obtained by ball milling of the components used for Example 1-2. It is clear the presence of Li—S—P bonds in LPS is confirmed. However, in the particulate material obtained by ball milling, not only the Li—S—P bond is identified, but also P—S$_x$—P bonds or V$_x$S$_y$ bonds and V$_x$P$_y$ bonds. The P—S$_x$—P (sulphur bridging) or V$_x$P$_y$ bonds result from the chemical reaction of the LPS with $V_2O_5$.

Further, the measured cathode capacity expressed per gram of electrode material increases with an increasing ratio of electrode active component in the electrode.

From Table 2 it follows also that the values for the battery cells comprising Li$_6$PS$_5$Br as the lithium-comprising sulphide compound and as the solid state electrolyte are higher than for the battery cells comprising LPS as the lithium-comprising sulphide compound and as the solid state electrolyte (Examples 2-1 to 2-4 vs. Examples 1-1 to 1-4, respectively).

Figure 3:
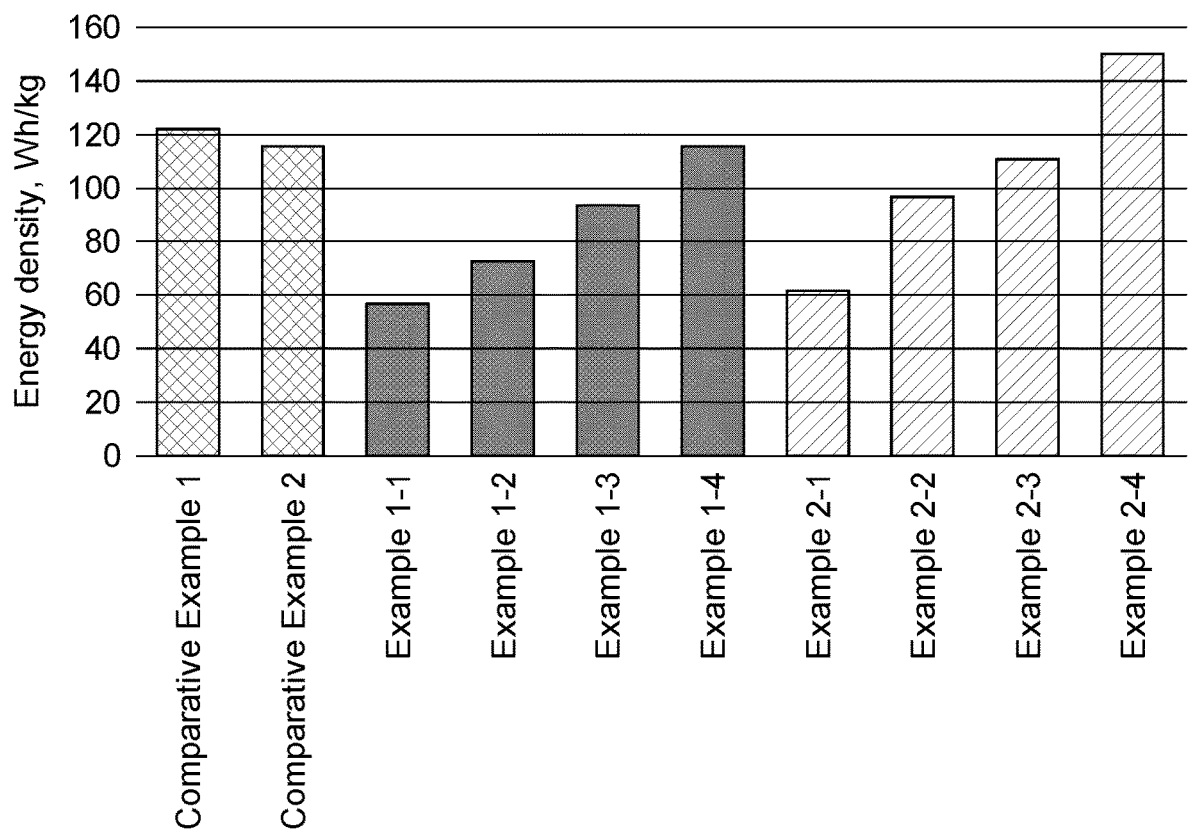
FIG. 3 represents the energy density values for reference and inventive battery cells.

FIG. 3 shows the measured energy density for the battery cells. It is clear that the cathode of the battery cell obtained from the same starting mixture that is ball milled (Example 1-4) instead of hand mixed shows not only a higher energy density than the hand mixed sample (Comparative example 2), but also shows a higher energy density than the ball milled NMC reference sample (Comparative example 1).

The invention claimed is:

1. A particulate material for a composite electrode, comprising as a ball milled mixture:
   an electrode active component comprising a transition metal M oxide, the transition metal having an oxidation state in the particulate material of 3+, 4+, and 5+,
   a oxide of a metal selected from the group consisting of Li, Al, Cu, Fe, Cr, Mn, Sn, Mo, Ni, Ag, Ru and Ti
   a lithium sulphide compound comprising an element X, wherein X is P, Ge, Si or Sn, and
   an electronically conductive carbon component,
   wherein
   the particulate material comprises one or more of M-S and M-X bonds: and
   the oxide of the metal is different from the transition metal M oxide.

2. A method for producing a particulate material for a composite electrode according to claim 1, comprising:
   ball milling a mixture comprising:
   an electrode active component comprising a transition metal M oxide having a oxidation state of 5+ and optionally 4+ and/or 3+,
   an oxide of a metal selected from the group consisting of Li, Al, Cu, Fe, Cr, Mn, Sn, Mo, Ni, Ag, Ru and Ti,
   a lithium sulphide compound comprising an element X, wherein X is P, Ge, Si or Sn, and
   an electronically conductive component,
   thereby obtaining the particulate material having M-S and M-X bonds,
   wherein the oxide of a metal (b) is different from the transition metal M oxide (a).

3. The method according to claim 2, wherein the first transition metal M is vanadium (V).

4. The method according to claim 3, wherein the transition metal M oxide is $V_2O_5$, $V_2O_3$, VO, $H_3V_5O_7$, $H_2V_3O_g$, or a mixture of any two or more thereof.

5. The method according to claim 2, wherein the lithium sulphide compound comprises a Li—S—X bond structure.

6. The method according to claim 2, wherein the lithium sulphide compound comprises a LiPS-based component, a LiGePS-based component, a LiSiPS-based component, a LiSnPS-based component, a LiSiSnPS-based component, a LiGeSnPS-based component, or a mixture of any two or more thereof.

7. The method according to claim 2, wherein the first lithium sulphide compound is obtained by ball milling a mixture comprising $Li_2S$ and $P_2S_5$.

8. The method according to claim 2, further comprising a ball milling of a mixture comprising $Li_2S$ and $P_2S_5$ to obtain a lithium sulphide compound which comprises a Li—S—X bond structure prior to, and the ball milling of the mixture.

9. The method according to claim 2, wherein a solvent is added during the ball milling.

10. The particulate material according to claim 1, wherein the transition metal M is vanadium (V), and the electrode active component comprises $V_2O_5$, $V_2O_3$, VO, $H_3V_5O_7$, $H_2V_3O_8$, or a mixture of any two or more thereof.

11. The particulate material according to claim 1, wherein the lithium sulphide compound comprises a LiPS-based component, a LiGePS-based component, a LiSiPS-based component, a LiSnPS-based component, a LiSiSnPS-based component, a LiGeSnPS-based component, or a mixture of any two or more thereof.

12. The particulate material according to claim 1, wherein a ratio of the weight of the electrode active component to a sum of the weight of the electrode active component and the weight of the lithium sulphide compound is from 0.1 to 0.9.

13. A composite cathode comprising the particulate material according to claim 1.

14. A battery cell comprising a composite cathode according to claim 13.

* * * * *